United States Patent [19]

Van Ochten

[11] Patent Number: 5,704,830
[45] Date of Patent: Jan. 6, 1998

[54] DEVICE FOR STUNNING AN ANIMAL FOR SLAUGHTER

[75] Inventor: Sander Antonie Van Ochten, Lichtenvoorde, Netherlands

[73] Assignee: Stork R.M.S. B.V., Netherlands

[21] Appl. No.: 647,944

[22] PCT Filed: Sep. 29, 1995

[86] PCT No.: PCT/EP95/03883

§ 371 Date: Jul. 16, 1996

§ 102(e) Date: Jul. 16, 1996

[87] PCT Pub. No.: WO96/10336

PCT Pub. Date: Apr. 11, 1996

[30] Foreign Application Priority Data

Sep. 30, 1994 [NL] Netherlands .................. 9401610

[51] Int. Cl.⁶ ............................................. A22B 3/06
[52] U.S. Cl. ............................................. 452/58
[58] Field of Search ............................. 452/58, 57

[56] References Cited

U.S. PATENT DOCUMENTS

| | | | |
|---|---|---|---|
| 4,319,383 | 3/1982 | Nijhuis | 452/58 |
| 4,953,263 | 9/1990 | Lambooy | 452/58 |
| 5,326,307 | 7/1994 | Bernardus et al. | 452/58 |
| 5,486,145 | 1/1996 | Dorsthorst et al. | 452/58 |

FOREIGN PATENT DOCUMENTS

| | | | |
|---|---|---|---|
| 680889 | 5/1930 | France | 452/58 |
| 1632084 | 6/1971 | Germany | 452/58 |
| 4032203 | 5/1992 | Germany | 452/58 |
| 4037203 | 5/1992 | Germany | A22B 3/06 |
| 9200487 | 10/1993 | Netherlands | A22B 3/06 |
| 201402 | 5/1986 | New Zealand | A22B 3/06 |

OTHER PUBLICATIONS

Anil, M.H. et al., "The Effectiveness of High Frequency Electrical Stunning in Pigs", *Meat Science*, vol. 31, 1992, pp. 481–491.

*Primary Examiner*—Willis Little
*Attorney, Agent, or Firm*—Webb Ziesenheim Bruening Logsdon Orkin & Hanson, P.C.

[57] ABSTRACT

The invention relates to a device for stunning an animal for slaughter, for instance a pig, which device includes: transporting means for transporting an animal for slaughter through the device; at least two head electrodes for placing against the head of the animal; at least one body electrode for placing against the head of the animal; a first electrical component connected to the head electrodes for carrying through the brain of the animal a first current pulse; and second electrical component connected to the body electrode for carrying through the body of the animal a second current pulse.

16 Claims, 2 Drawing Sheets

DEVICE FOR STUNNING AN ANIMAL FOR SLAUGHTER

BACKGROUND OF THE INVENTION

The invention relates to a device for stunning an animal for slaughter, for instance a pig, which device comprises: transporting means for transporting an animal for slaughter through the device; at least two head electrodes for placing against the head of the animal; at least one body electrode for placing against the body of the animal; first electrical means connected to the head electrodes for carrying through the brain of the animal a first current pulse; and second electrical means connected to the body electrode for carrying through the body of the animal a second current pulse.

Such a device is described in applicant's Netherlands patent application NL-A-92 00487.

In respect of this Netherlands patent application it is an object of the invention to effect a stunning of the animal for slaughter in very reliable and rapid manner and to calm the animal for slaughter.

A further object of the invention is to spare the animal needless suffering and to cause loss of consciousness to occur as quickly as possible.

Another object of the invention is to embody the stunning device such that it has a large processing capacity so that the device can be applied on an industrial scale.

During delivering of the current pulses damage to and bleeding in muscles can occur as a consequence of the thereby occurring strong muscle contractions. The meat can hereby deteriorate in quality. In this respect it is an object of the invention to embody the stunning device such that the danger of convulsive muscle contractions is considerably reduced, whereby the meat can be of better quality.

SUMMARY OF THE INVENTION

In order to realize the above stated objectives the invention provides a device in accord with the first paragraph, in which said first current pulse comprises an alternating current component with a first basic frequency $f_1$ of at least 100 Hz; said second current pulse comprises an alternating current component with a second basic frequency $f_2$ which is lower than $f_1$ and which begins a maximum of 8 s after the start of the first current pulse; and during the contact between the electrodes and the animal for slaughter the relative velocity between the electrodes and the animal for slaughter is substantially zero. It should be noted that the time period between the beginning of the second current pulse and the start of the first current pulse may be negative.

With the first, relatively high-frequency current pulse a stunning takes place and docility occurs in the short term. Delivery of the second current pulse causes a disfunction of the heart rhythm, which also provides docility in the longer term.

It is noted that the use of a basic frequency $f_1$ of at least 100 Hz has the effect of causing less convulsions.

The transporting and the stated time span provide a large processing capacity. It is important here to obtain a good contact between the electrodes and the animal for slaughter in order to minimize the percentage of incompletely stunned animals.

In respect of the stated basic frequency it is noted that any finite signal can be thought of as being built up of a number of frequencies. By the term "basic frequency" is understood the lowest repetition frequency which is recognizable in the waveform and which can be derived for instance from the repetition frequency of crests, valleys, zero-axis crossings or the like.

The alternating current components in the current pulses can in principle take any desired form, for example that of a sine, a block, a repeating pulse, a sawtooth etc. These alternating current components can optionally be superimposed on another component for the whole time duration of a current pulse or during a part thereof. This other component can itself also consist of an alternating current component or a direct current component.

Claims 2, 3 and 4 give a number of possible values of $f_1$ in order of increasing preference. It has been found that the electric current which is required for inducing loss of conscience increases generally over 1 kHz.

Preferably $f_2 < 1$ kHz.

By preference $f_2 < 100$ Hz.

The use of the electrical source frequency as stated in claim 7 has the advantage of very easy availability.

The choice of frequency for the second current pulse as stated in claim 8, $f_2 = (15 \pm 10)$ Hz, easily induces a heart fibrillation resulting in a permanent heart disfunction and thereby docility of the animal for slaughter.

In Meat Science 31 (1992), 481–491, experiments are described which relate to carrying through the head of an animal for slaughter a current pulse consisting of an alternating current with a frequency of about 1600 Hz. In contrast to these experiments the invention provides a device which is capable of effecting in the correct manner a rapid disturbance of the heart, whereby a considerable lengthening of the period of docility of the animal for slaughter is achieved. A device according to the invention provides, in contrast to the said experiments, the option of use on industrial scale.

Furthermore reference is made to "Advances in Animal Wellfare Science" by M. W. Fox and L. D. Mickley, 1986, "Cardiac arrest stunning of lifestock and poultry", pages 1–30, provides a general survey of parameters and combinations thereof known in the art of stunning animals for slaughter. This general survey does not suggest the use of two current pulses having different frequencies. Furthermore in this survey there is no suggestion of provisions in order to ensure that the relative velocity between the related electrodes and the animal for slaughter is substantially zero.

It is generally the objective to cause the time durations of the current pulses on the one hand to be sufficiently long to cause the stunning to take place as rapidly and effectively as possible, while on the other hand a short time duration of the current pulses is aimed for, whereby the treatment speed can be as high as possible. In this latter respect the diverse electrodes can be reciprocally movable along the transporting means such that during delivery of the current pulses the electrodes move at substantially the same speed as the animal for stunning, which in the combination according to the invention contributes to a surprisingly good stunning in a short time span.

Preferably, in the device according to the invention, the time duration $t_1$ of the first current pulse is a certain amount larger than the time period between the start of the first current pulse and the beginning of the second current pulse.

Surprisingly, by the use of an overlap between the two current pulses it is possible to stun an animal for slaughter with substantially less convulsions, reflexes, muscle contractions and the like, resulting in a better meat quality and a more easy handling of a stunned animal for further treatment. It has been found that minimum convulsions and muscle contractions occur at a frequency of the first current pulse amounting to about 800 Hz. This is the subject matter of claims 3 and 4. More generally, the strength of the convulsions decreases with frequencies of the first current pulse of over 100 Hz.

Preferably, the said amount specified above and in claim 9 is at least 0,2 s.

Preferably, the device is characterized in that the time duration between the beginning of the first current pulse and the end of the second current pulse amounts to 1,5–8 s.

It has appeared that the animal's sensation of pain after stunning is effectively suppressed if $t_1 \geq 1$ s.

In another embodiment the device may be characterized in that the time duration $t_2$ of the second current pulse satisfies the relation $1 s < t_2 < 3,5$ s.

Furthermore the invention relates to a device of the type set forth above, said device comprising two body electrodes for placing against the body of the animal such that the second current pulse is carried for a substantial part through the heart region of the animal via these two body electrodes. It appears that the second current pulse flowing through the heart region is effective for a very quick and effective stunning.

Also the invention relates to a device of the type set forth above, comprising transporting means for transporting an animal for slaughter through the device such as a conveyor belt or restrainer, wherein during this transport the animal assumes a known position, for instance such that its median plane extends at least more or less horizontally or vertically.

BRIEF DESCRIPTION OF THE DRAWINGS

The invention will now be elucidated with reference to the annexed drawing, wherein.

DESCRIPTION OF THE PREFERRED EMBODIMENTS

Figure 1:
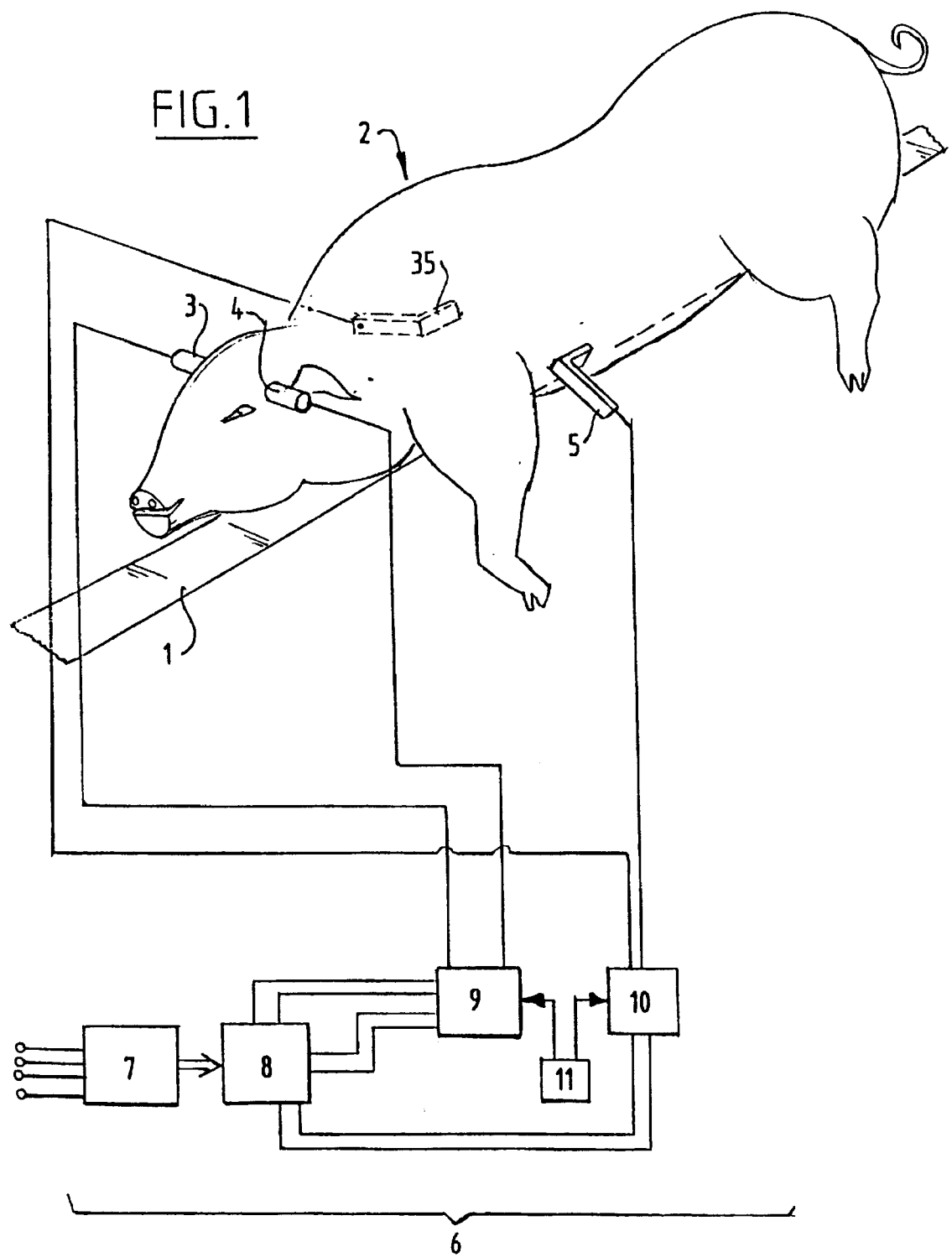
FIG. 1 shows a perspective view of a pig lying on a restrainer, wherein a device according to the invention is shown highly schematically in operating situation.
Figure 2:
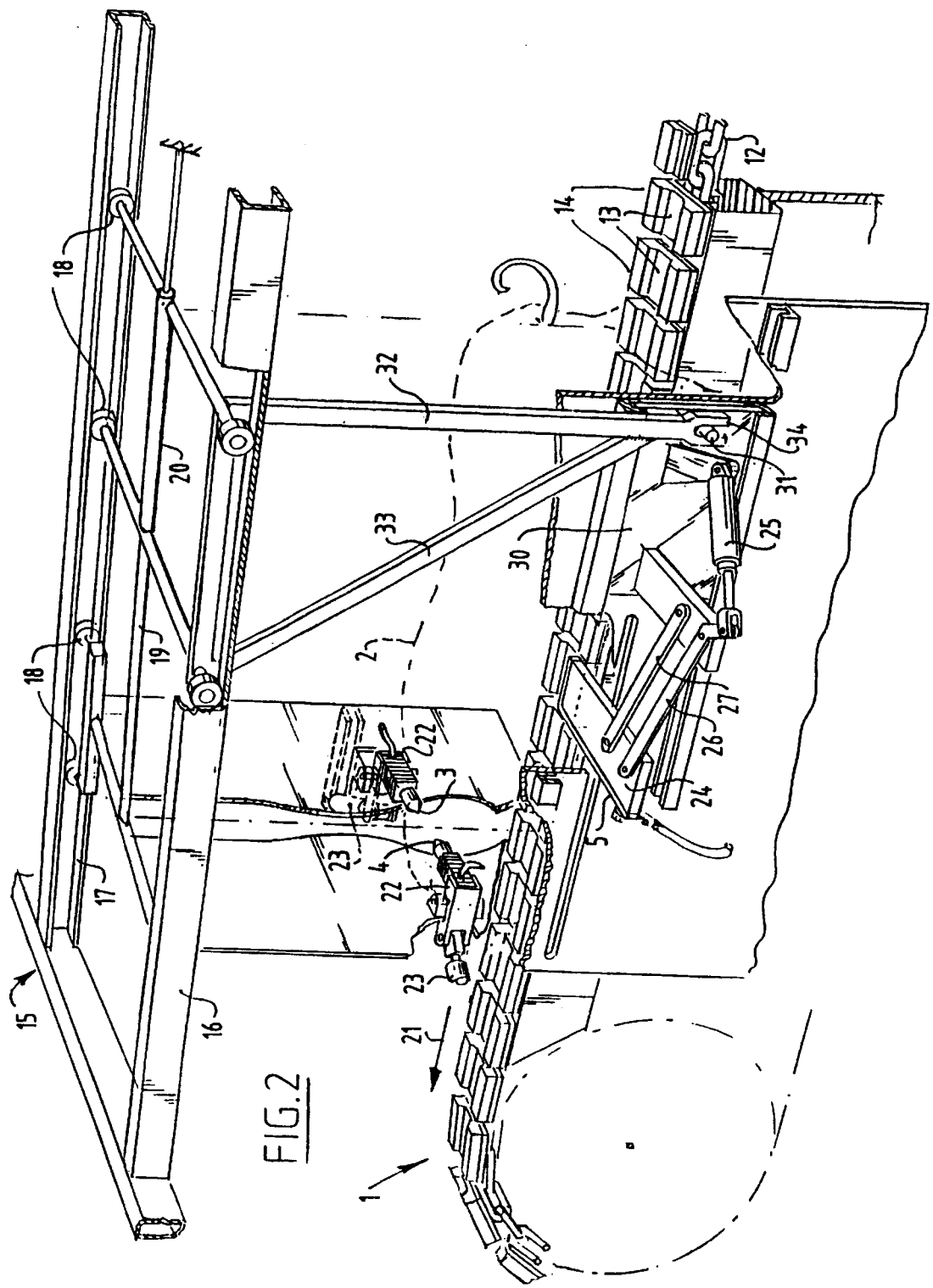
FIG. 2 shows a partly broken away perspective view of another embodiment of the device.

As shown in FIGS. 1 and 2, lying on a conveyor belt 1, a so-called restrainer, is a pig 2 which is to be stunned. According to the invention use is made for this purpose of a number of electrodes, in the embodiment drawn two head electrodes 3, 4 and two body electrodes 5, 35 which are connected to an electrical supply device 6 for successively carrying a current pulse through the head of the pig 2 via the head electrodes 3, 4 and carrying a second current pulse through the heart region of the animal via the body electrodes 5, 35. In FIG. 1 the reference numeral 7 designates a transformer which provides a power supply source 8 with the correct voltage and current. The head electrodes 3, 4 receive current via a first switch 9, while passage of current via body electrodes 5, 35 is controlled by a second switch 10. These switches are controlled by a control unit 11 which ensures that a first current pulse is carried through head electrodes 3, 4 followed by a second current pulse via body electrodes 5, 35.

The diverse relevant parameters of the first and the second current pulses are defined in claims 2–14.

For the sake of clarity the power supply device 6 is not drawn in FIG. 2.

The conveyor 1 comprises a chain 12 which is driven by non-drawn means and bears blocks 14 each provided with a central longitudinal recess 13. The longitudinal recess 13 has a form such that the breast bone of pig 2 can be accommodated therein. This conveyor has a construction such that the pig remains lying docilely thereon in a fixed position.

Via a frame 15 with rails 16, 17 a carriage 19 is displaceable by means of wheels 18 in lengthwise direction with conveyor 1. This carriage 19 can be driven by a cylinder 20 which is energized by non-drawn means for reciprocating displacement of carriage 19. Because the carriage 19 is driven in the transporting direction 21 at the same speed as conveyor 1 the electrodes 3, 4, 5, after having been placed in the desired position, can move along with the pig 2 for a period of time.

The electrodes 3, 4 are carried by a pivot arm 22 which is pivotable by means of cylinders 23, the driving whereof is likewise not drawn. Herewith the electrodes 3, 4 can be arranged with some force against the head of pig 2.

Electrode 5 is carried by a plate 24 which is movable toward and away from pig 2 by means of a cylinder 25. This latter engages onto an arm 26 which, together with an arm 27 parallel thereto, supports the plate 24.

By making use of the above described construction the electrodes 3, 4, 5 can be pressed with a sufficiently great pressure against the pig 2, whereby the transfer resistance between the electrodes and the pig remains limited an a relatively high current can be realized at a relatively low voltage.

It is noted that in the embodiment of FIG. 2 the second body electrode 35 as according to FIG. 1 is omitted. The second current pulse is carried in this case through the body electrode 5 and at least one of the head electrodes 3, 4.

Attention is further drawn to the fact that the positioning of the body electrodes 5, 35 in FIG. 1 is only shown by way of example. In another embodiment the second body electrode 35 can for instance engage on the front side of the breast of the animal.

I claim:

1. A device for stunning an animal for slaughter, which device comprises:

transporting means for transporting the animal for slaughter through the device;

at least two head electrodes configured to be placed against the head of the animal;

at least one body electrode configured to be placed against the body of the animal;

first electrical means for delivering through the brain of the animal a first current pulse with an alternating current component having a first basic frequency $f_1$ of at least 100 Hz, said first electrical means connected to said head electrodes; and second electrical means for delivering through the body of the animal a second current pulse with a second basic frequency $f_2$ which is lower than $f_1$ and which begins a maximum of 8 seconds after a start of the first current pulse, said second electrical means connected to said at least one body electrode, wherein during contact between the electrodes and the animal for slaughter, a relative velocity between the electrodes and the animal for slaughter is substantially zero.

2. The device as claimed in claim 1, wherein said first electrical means is configured such that $f_1 \geq 200$ Hz.

3. The device as claimed in claim 2, wherein said first electrical means is configured such that $f_1 = (800 \pm 600)$ Hz.

4. The device as claimed in claim 3, wherein said first electrical means is configured such that $f_1 = (800 \pm 300)$ Hz.

5. The device as claimed in claim 1, wherein said second electrical means is configured such that $f_2 < 1$ kHz.

6. The device as claimed in claim 5, wherein said second electrical means is configured such that $f_2 < 100$ Hz.

7. The device as claimed in claim 6, wherein the device is connected to an electrical source and said second electrical means is configured such that $f_2$ equals the frequency of the electrical source.

8. The device as claimed in claim 6, wherein said second electrical means is configured such that $f_2 = (15 \pm 10)$ Hz.

9. The device as claimed in claim 1, wherein said first electrical means is configured such that a time duration $t_1$ of the first current pulse is larger than a time period between the start of the first current pulse and the beginning of the second current pulse.

10. The device as claimed in claim 9, wherein said first electrical means is configured such that the time duration $t_1$ of the first current pulse is $\geq 0.2$ seconds larger than the time period between the start of the first current pulse and the beginning of the second current pulse.

11. The device as claimed in claim 1, wherein said first electrical means is configured such that a time duration between the start of the first current pulse and an end of the second current pulse is about 1.5–8 seconds.

12. The device as claimed in claim 1, wherein said first electrical means is configured such that a time duration of the first current pulse is $\geq 1$ second.

13. The device as claimed in claim 1, wherein said first electrical means is configured such that a time duration of the first current pulse is $<3$ seconds.

14. The device as claimed in claim 1, wherein said second electrical means is configured such that a time duration $t_2$ of the second current pulse satisfies the relation 1 second$<t_2<3.5$ seconds.

15. The device as claimed in claim 1, comprising two body electrodes configured to be placed against the body of the animal such that the second current pulse is carried for a substantial part through a heart region of the animal via the two body electrodes.

16. The device as claimed in claim 1, wherein the transporting means comprises at least one of a conveyor belt and a restrainer, and wherein during transport the animal assumes a position such that a median plane of the animal extends at least one of horizontally and vertically.

* * * * *